UNITED STATES PATENT OFFICE.

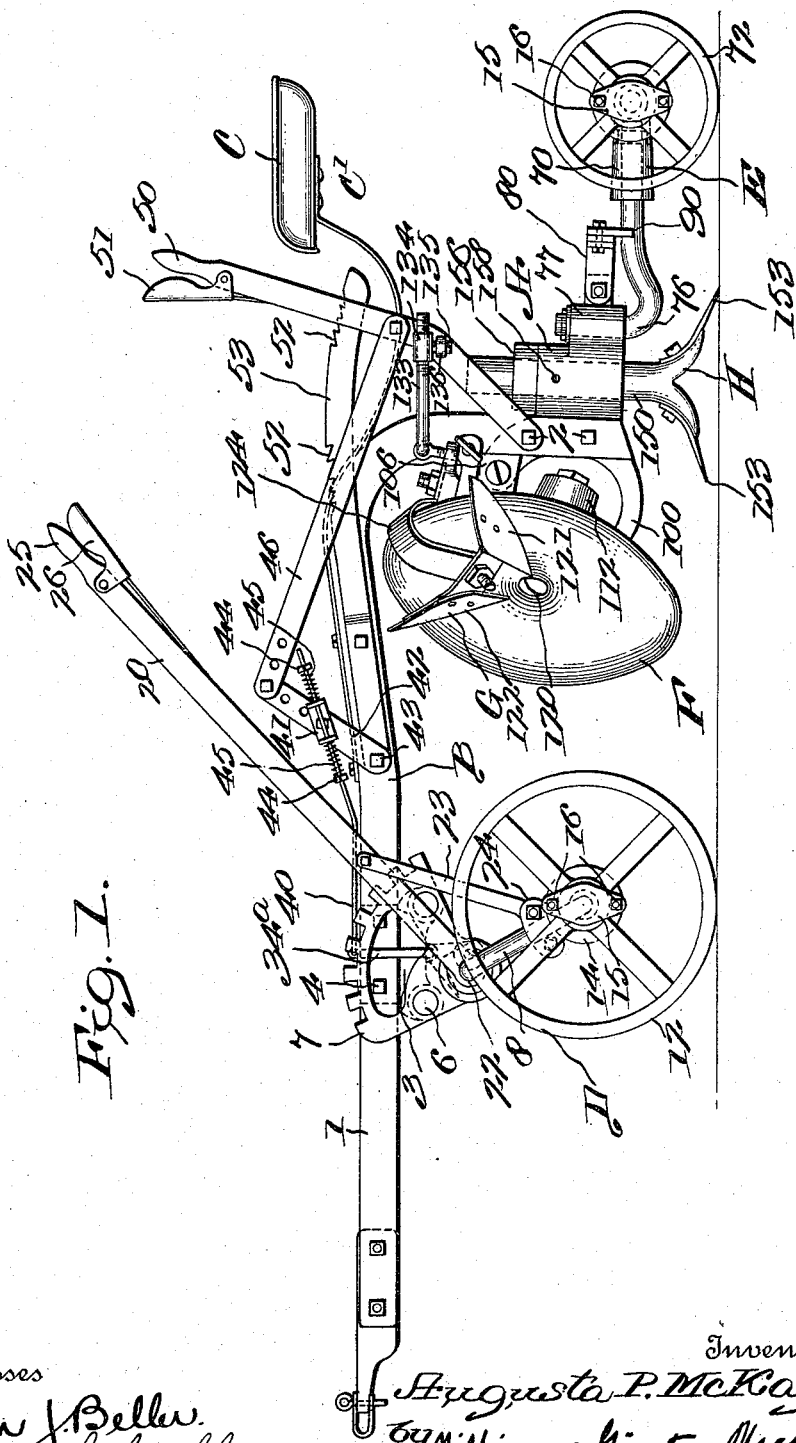

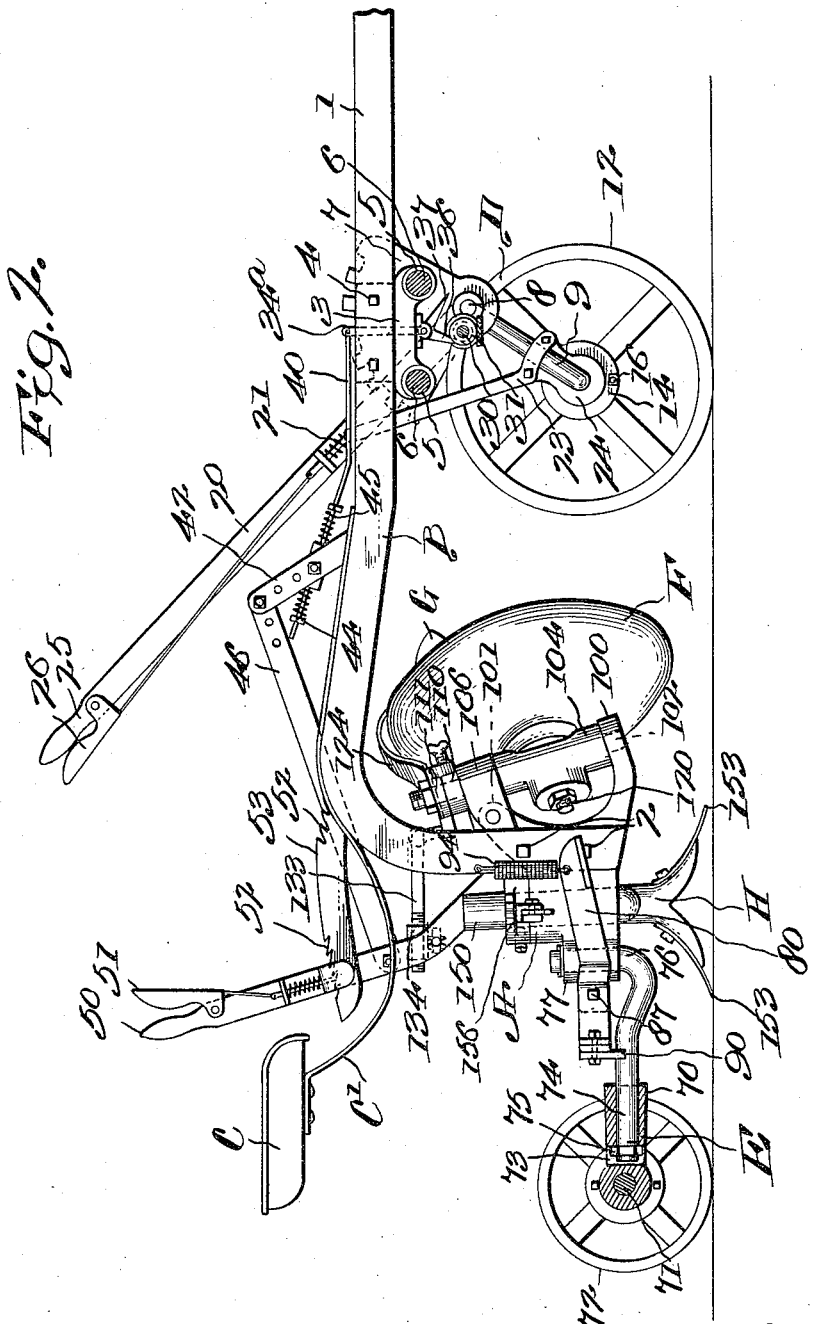

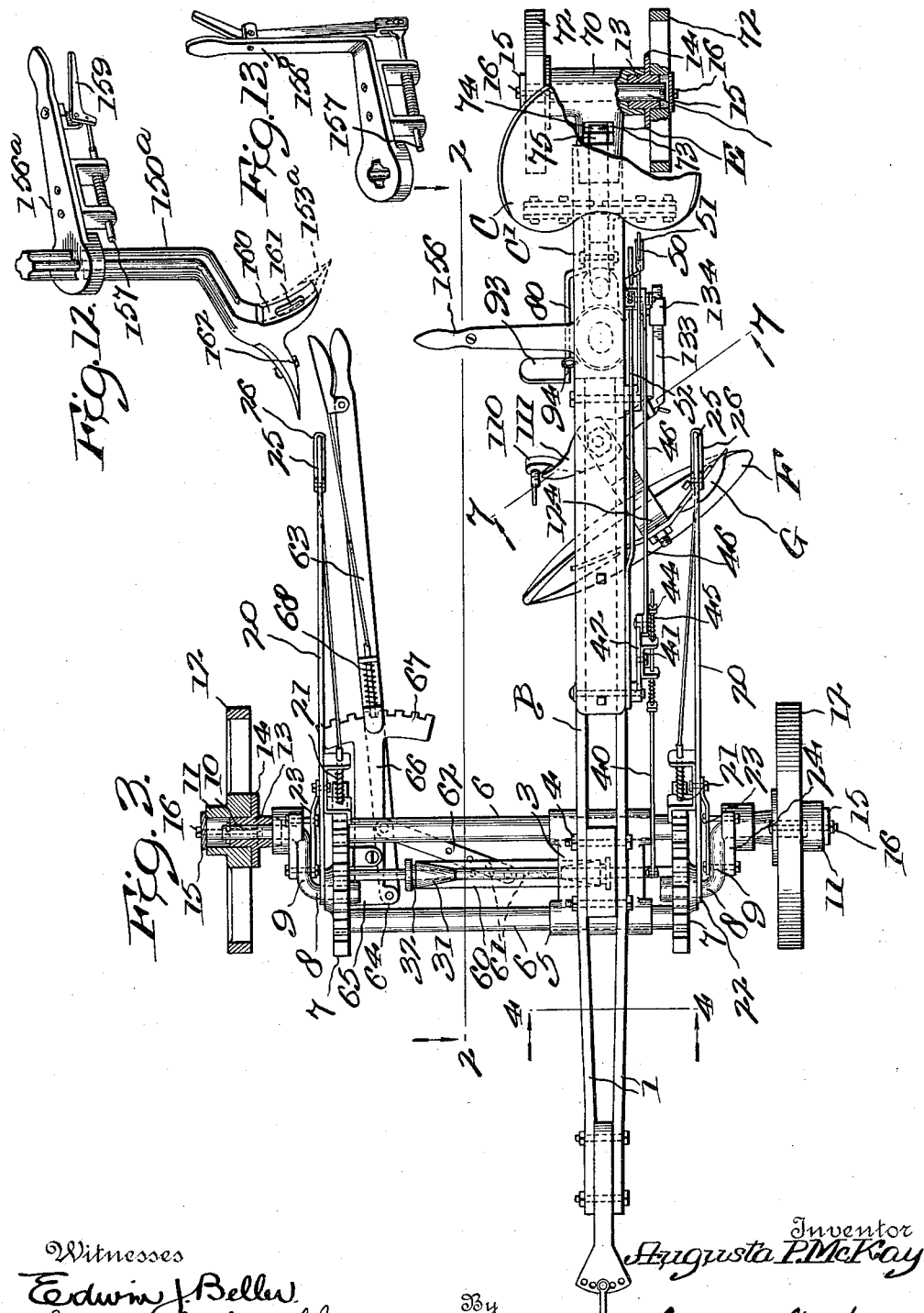

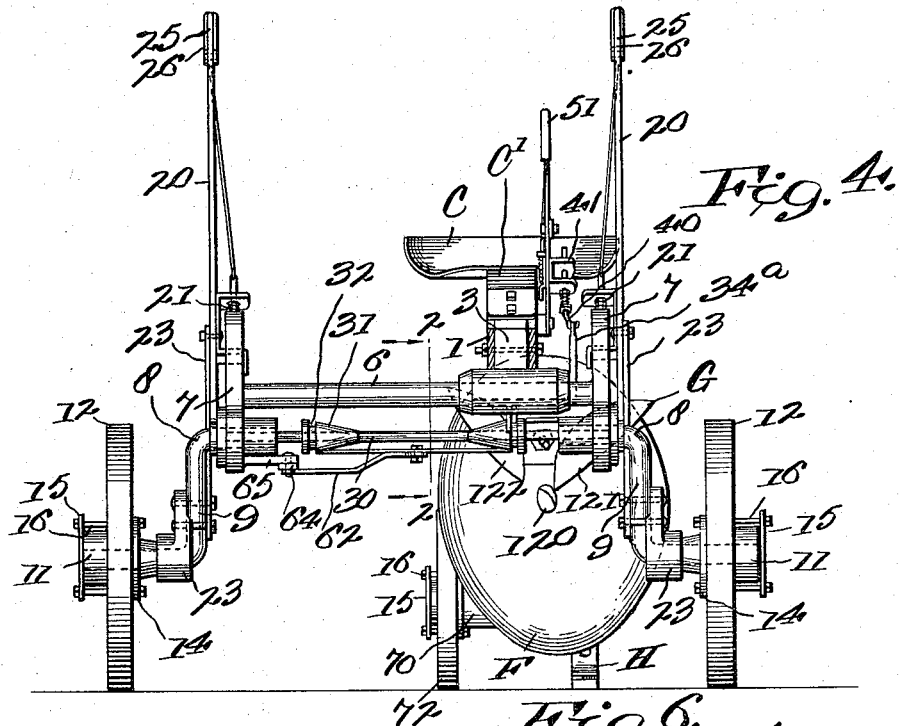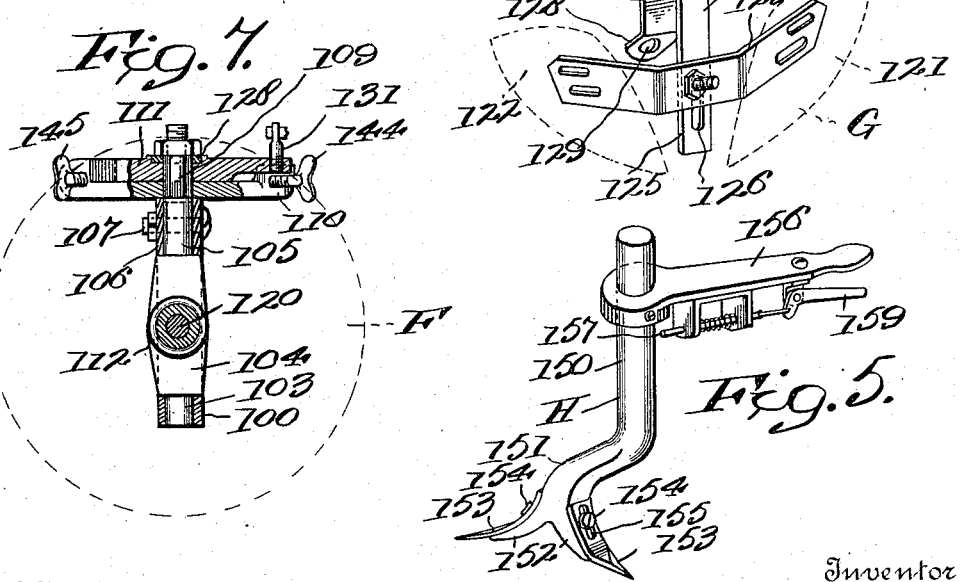

AUGUSTA P. McKAY, OF ROME, GEORGIA.

REVERSIBLE DISK PLOW AND CULTIVATOR.

1,165,267.   Specification of Letters Patent.   Patented Dec. 21, 1915.

Application filed March 8, 1915. Serial No. 12,881.

*To all whom it may concern:*

Be it known that I, AUGUSTA P. McKAY, a citizen of the United States, residing at Rome, in the county of Floyd and State of Georgia, have invented certain new and useful Improvements in Reversible Disk Plows and Cultivators; and I do hereby declare the following to be a full, clear, and exact description of the invention, such as will enable others skilled in the art to which it appertains to make and use the same.

My present invention relates to improvements in reversible disk plows and cultivators, and it is intended to provide a reversible plow in which the disk may be easily reversed at each end of the furrow when plowing on a hillside, thereby causing the plow to alternate from a right to a left-handed plow and vice versa, so as to turn the soil down the hill continuously.

My invention also relates to automatic means for locking the plow beam in the desired position laterally, relative to the front axle, and for imparting a more or less additional lateral movement to same for the purpose of varying the width of the furrow.

My invention also relates to means, operable from the driver's seat, for raising or lowering either or both ends of the front axle.

My invention also relates to means for simultaneously swinging the axis of the disk laterally to the desired angle, and for controlling and reversing a pair of scrapers which alternately tend to keep the face of the disk clean.

My invention further consists in providing a sub-soiler attachment with means for reversing same controllable from the driver's seat, with means, also, for removing said sub-soiler attachment when desired.

My invention also relates to an improved rear truck attachment swiveled to the main frame, with means for releasing same, operable, when desired, from the driver's seat.

My invention also includes the provision of a central main frame, or casting, to which the traction beam is connected, and to which the shaft of the disk is swiveled; and to which casting the various operative parts of the apparatus are attached, as will be hereinafter more fully described.

According to my invention the various control levers are all located in such position as to be conveniently operable from the driver's seat, which is located above and slightly in rear of the main frame or casting.

My invention will be understood by reference to the accompanying drawings, in which the same parts are indicated by the same reference symbols throughout the several views:—

Figure 8:
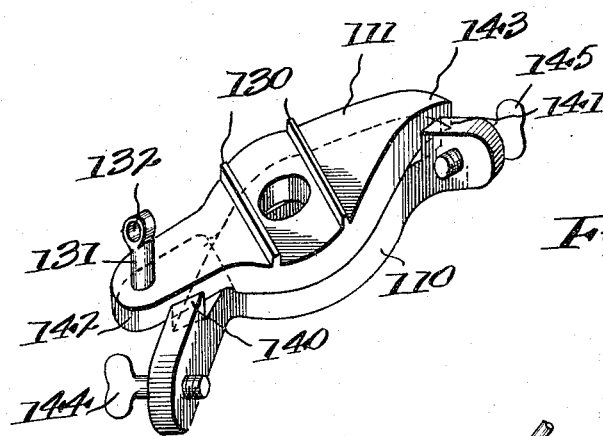
Figure 9:
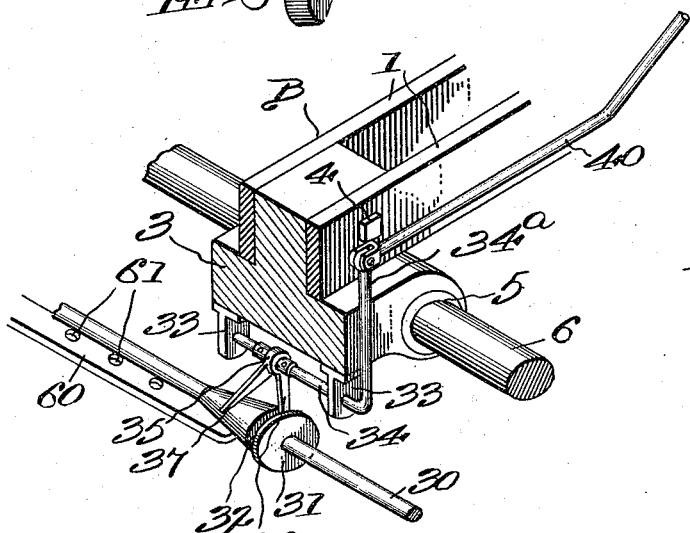
Figures 10, 11:
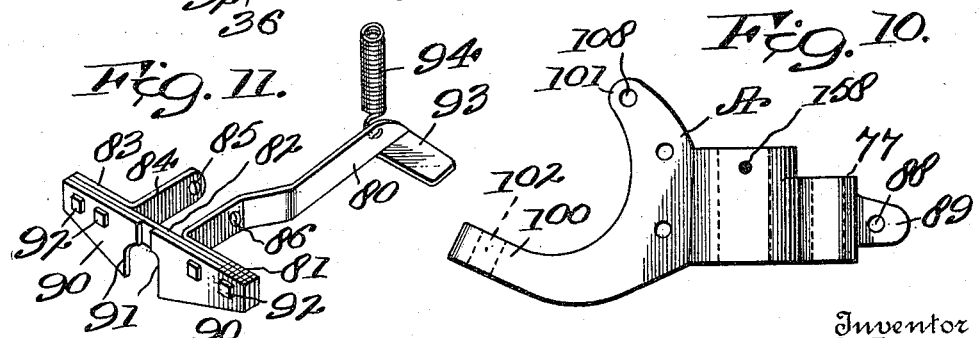

Figure 1 is a side elevation of the complete apparatus as seen from the left of the machine, looking forward; Fig. 2 is a view showing the other side of the apparatus, but with the front truck shown in section along the line 2—2 of Figs. 3 and 4, and looking in the direction of the arrows; Fig. 3 is a plan view of the device, parts being shown broken away; Fig. 4 is a front view of the apparatus, the end of the draft beam being cut away; the view being taken along the line 4—4 of Fig. 3, and looking in the direction of the arrows; Fig. 5 is a detail showing the detachable and reversible sub-soiler attachment; Fig. 6 is a detail showing the mode of attachment of the scrapers for the disk; Fig. 7 shows part of the mechanism for reversing the disk and scrapers; parts being shown in section along the line 7—7 of Fig. 3, and looking in the direction of the arrows; Fig. 8 is a perspective view of the two plates shown near the top of Fig. 7 as detached from the machine; Fig. 9 is a perspective view showing the mode of automatically locking the draft beam at the desired position relative to the front axle; Fig. 10 is a side elevation of the main frame or casting which carries the major portion of the operative parts of the machine; Fig. 11 is a perspective view showing the automatic latch for locking the rear truck against lateral movement; Fig. 12 is a perspective view of a modified form of sub-soiler attachment which may be used in connection with the apparatus shown in the other figures; and Fig. 13 shows a modified form of hand lever for reversing the sub-soiler attachment and for locking the same in the desired position.

A represents the main frame or casting to which the traction plow, or traction beam, B is attached, which beam is of the usual curved shape shown in Figs. 1 and 2, and is preferably of built-up metal construction, as shown in Fig. 3. The driver's seat C is connected to the beam B by a suitable resilient plate C'.

D represents the front truck which supports the forward end of the draft beam, as will be hereinafter more fully described.

E represents the rear truck which is swiveled to the main casting A.

F represents the disk, and G the scraper attachment which are carried by the main casting A, and simultaneously operated, as will be hereinafter more fully described.

H represents the reversible sub-soiler attachment which is journaled in the main casting A.

The parts thus lettered from A to H constitute the main operative parts of the machine, which are controlled by a system of levers, latches, and other attachments which will now be described in detail.

The main frame or casting A with its attachments is supported on the front and rear trucks D and E, as shown most clearly in Fig. 2. The plow beam B is preferably formed of two side metal plates 1—1, secured together in the usual way, and bolted, as at 2, to the main casting A. Just above the front truck the beam is provided with a housing 3, rigidly connected thereto, as at 4, and provided with guide sleeves 5 adapted to engage and to slide laterally upon the cross bars 6, which are rigidly connected at their ends to the sectors 7, journaled on the stub axles 8 of the forward truck D; thus these rods and sectors form a supporting frame carried by said axles on which the forward end of the draft beam is supported.

The front axle is formed of the two stub axles 8, each bent downwardly, as at 9, terminating in the usual spindle 10, engaging in the hub of the wheel, as shown in Fig. 3. To provide a dust-tight journal bearing for the hubs of the wheels, I preferably use the construction shown in Fig. 3, although any other suitable bearing may be adopted if desired. In this construction, the hub 11 of the front wheel 12 is closed on one side by the bearing block 13, which projects into said hub and forms a skein on which the wheel turns; the inner side of said skein being flanged, as at 14, to mask the inner face of the hub, while the outer face of the hub is closed by a plate 15 connected by bolts 16 to the flange 14, as shown most clearly in Figs. 1 and 3.

In order to raise or lower either of the stub axles 8, I provide hand levers 20 having a ratchet and pawl arrangement 21, adapted to engage the corresponding sector 7. These levers have their front lower ends 22 journaled on the horizontal portion of the stub axle 8, and are connected to the bent portion 9 of same by the brace 23 and bracket 24, so that turning the lever 20 will swing the downwardly-projecting arm of the stub axle about its horizontal axis, thus lowering the wheel. There is an operating hand lever for each axle so that the frame supporting the plow beam may be lowered at either or both ends, as desired. These two levers 20 are provided with handles 25 and hand grips 26 for releasing the pawls from engagement with the sectors when desired. These hand levers are so located that they will be within easy reach of the driver mounted on the seat C.

The housing 3 is free to slide on the cross bars 5, unless locked in the desired position, and this locking is automatically accomplished by the apparatus which will now be described. Spanning the sectors and forming a part of the body of the front truck is a rod 30, on which are adjustably mounted, at the desired position, two cones 31 tapering inwardly toward each other as shown in Fig. 3, and each provided with an annular notch 32, see Figs. 3 and 9. The housing 3 is provided with two downwardly-projecting bearings 33, see Fig. 9, in which is journaled the rod 34 carrying a latch in the form of a bell-crank lever 35, having two arms 36 and 37 set axially one behind the other, as shown in Fig. 9. This bell-crank lever is fast on the rod 34, and this rod is provided with an upturned end 34ª connected by the rod 40 to the plate 41 swiveled in the link 42, which is pivoted, as at 43, to the traction beam as shown in Fig. 1. This rod 40 passes through the swiveled plate 41 and carries two collars 44 engaging corresponding springs 45, by which springs the bell-crank lever 35 is normally centered, unless forced out of same by the operation of the parts.

The link 42 is pivotally connected by the link 46 to the operating lever 50 which has a ratchet and pawl arrangement 51, engaging the rack teeth 52 carried by the rack 53 fast to the side of the draft beam, as shown in Fig. 1. By pressing forward on this lever 50, the engaging arm 36 of the bell-crank lever 35 is thrown out of engagement with the notch in the corresponding cone; and the other arm 37 of the bell-crank lever is thrown into position adapted to engage the cone at the other side of the front truck. When it is desired to turn the plow, the draft animals pulling laterally on the end of the beam will swing the housing 3 across the front truck toward the opposite end of same, and will cause the engaging arm 37 of the bell-crank lever to ride up on the opposite cone, such riding up being permitted by the yielding of the springs 45, and this arm will then snap into engagement with the groove of the opposite cone, thus locking the plow beam to the opposite side of the front truck. This swinging of the plow beam from one side to the other of the front truck will normally determine the width of the furrow, but I provide an auxiliary attachment by which the width of the furrow may be still further regulated, which comprises means for moving the locking cones laterally through the desired distance, which is accomplished as follows:—These cones are connected together by a link 60, which is preferably provided with a series of holes 61, which holes provide convenient adjustable connections for the link 62 connected to the lever 63, which is hinged at its forward end to the lug 64 projecting from the heel 65 of the plate 66, fast to the framework of the front truck, which plate 66 terminates in a sector 67 adapted to be engaged by the ratchet and pawl arrangement 68 carried by the lever 63. By withdrawing this ratchet and pawl arrangement and swinging this lever 63 through the desired position laterally, the position of the locking cones 31 may be adjusted as desired, and the width of the furrow may be varied within certain limits. It is intended that the front wheel on the engaging side of the plow shall travel in the last furrow, and the width of the succeeding furrow will be determined by the position of the axis of the draft beam, which is regulated by the position of the corresponding locking cone as shown. Thus by setting this attachment at the desired position, the width of the furrow may be adjusted as desired. The rear truck is provided with a T-shaped journal bearing 70, across which the axle 71 extends, and on the ends of this axle there is a skein 13, flanged as at 14, similar to the one already described with reference to the front wheels, and the outer end of the axle box is closed by a plate 15 and bolts 16, as shown most clearly in Fig. 3. These plates 15 keep the wheels 72 in place. The stem of the T-shaped journal bearing is perforated, as at 73, to receive the end 74 of the trail bar, and this trail bar is swiveled in this T-shaped bearing and held therein by the nut 75. The front end of this bar is in the form of a goose neck 76, swiveled in the lug 77 in the rear portion of the main casting A. Thus the rear truck is adapted to swing about the goose neck 76, and the wheels are adapted to tilt around the spindle 74.

In order to clamp the trail bar in the desired position, I provide the locking lever arrangement, shown most clearly in Figs. 1, 2 and 11, comprising the lever 80, flanged, as at 81, to which flange the plate 82 is riveted, and the opposite end of said plate has an L-shaped plate 83 secured thereto, flanged forward, as at 84, and provided with a pivot bearing 85 corresponding to the pivot bearing 86 on the lever 80. Passing through these two pivot bearings is a pivot pin 87 engaging in a bearing 88 in the lug 89, projecting rearward from the main casting A, as shown most clearly in Fig. 10. In rear of the plate 82 are bolted two notched plates 90, each cut away, as at 91, to engage the trail bar and hold the same against swinging laterally. If it is desired to use the plow in one direction only, one of these plates 90 may be removed, or reversed, which may be done by taking out the bolts 92, and taking off the plate altogether, or turning it upside down, and re-securing it in place, as may be preferred. The front end of the lever 80 carries a pedal 93 adapted to be pressed down by the foot of the driver, and when it is desired to release the locking lever, the parts are restored to the initial locking position by the coil spring 94.

The main casting A is provided with two horns 100 and 101, the lower horn 100 being provided with a journal bearing 102 to receive the end 103 of the T-shaped axle bearing block 104. This bearing block has another arm 105 adapted to engage in the strap 106 which is held by the bolt 107 passing through the hole 108 in the horn 101 of the casting A. The upper end 109 of this bearing block 104 is preferably made angular, as shown in Fig. 7, to engage the plate 110 and passes loosely through the plate 111 whose function will be hereinafter described. The block 104 is provided with a laterally-projecting stem 112, in which is journaled the shaft 120 of the disk F; thus this disk swings laterally about the major axis of the block 104.

G represents the scraper attachment, shown in Figs. 1, 2 and 6, consisting of a pair of reversible scrapers 121 and 122, adjustably connected to the bent plate 123, which plate is adjustably connected to the bent plate 124 as by means of the bolt 125 passing through the slot 126. The top of this plate is U-shaped, as at 127, to pass over the edge of the disk F, and the end of said plate is bent flat, as at 128, and is provided with a bolt hole 129 to permit the same to pass over the upper end 109 of the block 104 and to engage between the ribs 130 on the upper plate 111, see Figs. 7 and 8. This plate 111 carries a bolt 131 swiveled thereto provided with an eye 132 engaging the connecting rod 133 which has its rear end screw-threaded as shown in Fig. 1 to engage a screw-threaded sleeve 134, which sleeve is provided with a laterally-projecting screw-threaded arm 135 engaging in the internally screw-threaded lug 136 fast to the hand lever 50; and thus this sleeve may be moved up or down, relative to said lever, and the rod may be screwed in or out of the sleeve, giving the desired adjustment to the reversible scraper. Thus it will be seen that the movement of the lever 50 will also move the scraper attachment as well as the locking bell-crank levers 36 and 37 hereinbefore referred to. The movement of the same lever reverses the disk as will now be described.

The plate 110 is rigidly attached to the angular portion 109 of the end of the block 104 and this plate is provided with two shoulders 140 and 141 adapted to bring up against the arms 142 and 143 of the upper plate 111, so that movement of the upper plate by means of the connecting rod 133 and lever 50 will not only rock the plate 111 about its pivot, but will also cause the upper plate 111 to rock the lower plate 110, turning with it the block 104 and swinging the shaft of the disk in a lateral direction to reverse the same. The rocking motion of the lower plate, and with it the rocking motion of the disk, is adjusted by means of the adjustable stops 144 and 145, which hit up against the sides of the draft beam as the disk is shifted from one position to the other, thus regulating the width of the cut made by the disk, and also regulating, if desired, the center line of said cut. The position of the disk should preferably be so adjusted that its vertical axis will lie directly under the axis of the draft beam. This will distribute the side thrust, and lessen the tendency of the disk to push the implement sidewise. There is a slightly greater vibrating movement of the upper plate 111 than of the lower plate 110 to give the scrapers the requisite additional travel to bring one close to the face of the disk, and to space the other away therefrom, so that the active scraper blade may lie close to the disk, and the other be clear thereof during the operation of the implement.

In order to provide a complete agricultural implement for the purpose stated, I provide a sub-soiler attachment H, which will now be described. One form of sub-soiler is shown in Figs. 1, 2 and 5, while slight modifications are shown in Figs. 12 and 13.

Referring first to the sub-soiler attachment shown in Figs. 1, 2 and 5, 150 is a metal bar or post journaled in the casting A, that is provided with a laterally-projecting heel 151 bifurcated as at 152, and having adjustably connected thereto the sub-soiler blades 153, held in place by bolts 154 passing through slots 155 in said blades. These blades are normally turned in the position to follow the lower edge of the disk by means of a suitable hand lever 156, which is automatically locked in the desired position by the spring-impressed bolt 157, as shown in Fig. 5, which projects into a recess 158 in the side of the casting A, as shown in Fig. 1. This bolt 157 may be unlocked by pressing up on the bell-crank lever 159, and the sub-soiler attachment may then be rotated about the post 150 by hand. The journal bearing for this post 150 is inclined at a slight angle rearward, as shown in Fig. 1; the result being that one of the sub-soiler blades will be lifted and the other lowered, as shown in said figure, when the lever 156 is reversed.

In the sub-soiler attachment shown in Fig. 12, the post 150ª is fluted to give a better engagement for the socket of the hand lever 156ª, and the blades 153ª fit in sockets 160 provided with elongated openings 161, and clamped by bolts 162. For convenience of access, the hand lever for reversing the sub-soiler attachment may be bent forward, as shown at 156ᵇ in Fig. 13, in which case it could be more conveniently reached by the driver without moving from his seat. It will be obvious that the sub-soiler attachment may be omitted, if desired, which can be readily done by taking off the hand lever 156 and drawing the post 150 out of the casting A.

The operation of the device is as follows: The parts being in the position shown in Fig. 3, and the left front wheel of said figure running in the preceding furrow, the new furrow will be cut by the disk F, whose width will be adjusted by the hand lever 63, and by the screw stops 144 and 145, as already described. Now when the end of the furrow is reached, and it is desired to turn the implement, the operator shoves forward (or backward, as the case may be) on the lever 50, which will disengage the bell-crank lever, or draft beam latch, from the groove in its corresponding cone, and at the same time the connecting rod 133 will rock the plates 110 and 111, and will shift the disk to the reverse position, and will also reverse the scraper blades, throwing the scraper blade formerly in engagement away from the disk, and moving the other scraper blade toward said disk. Thus the same movement of this hand lever 50 will shift the disk and the scraper blades, and will throw the bell-crank latch out of engagement with the forward truck. At the same time, the operator pressing on the pedal 93 will release the rear truck, and permit it to swing about its gooseneck 76. Now the draft animals pulling laterally on the plow beam, in the act of turning, will pull the housing 3 laterally across the front truck until the engaging arm of the bell-crank lever latch will ride up the inclined face of the opposite cone catch, and will snap into the groove of said cone under the action of one of the springs 45. If the sub-soiler attachment is in use, the driver should also shift the same by means of the hand lever 156. As soon as the plow is started again in the proper direction, the rear truck will assume its proper position, and the trail bar will automatically wedge up the locking lever 80 and will automatically be locked in place under the action of the spring 94; the driver having meantime removed his foot from the pedal 93. The adjustment of the width of the furrow may be made from time to time as desired by means of the hand lever 63 and the parts operated thereby, while the adjustment of the scrapers may be varied by adjusting the sleeve 134, and the movement of the disk may be adjusted by screwing in or out on the screw stops 144 and 145. The front truck may be brought to a level when plowing on a hillside by lowering the uphill axle of the forward truck, which may be done by means of the corresponding hand lever 20. The desired depth of the cut of the disk is regulated by the use of the levers 20, controlling the stub axles. The hand lever 50 is held in the desired position, when moved either forward or rearward, by means of the spring pawl 51 engaging the ratchet teeth 52 on the curved bar 53, which projects rearward from the traction beam.

It will be noted that the two horns 100 and 101 of the main casting A will afford strong and compact journal bearings for the sleeve carrying the disk shaft, and the reversing arms for the disk and the scrapers; and that the strain on the disk will not cause this sleeve to bind in its bearings when the operator desires to reverse the position of the disk and scrapers.

It will be obvious that various modifications might be made in the herein described apparatus, and in the construction, combination and arrangement of parts which could be used without departing from the spirit of my invention.

Having thus described my invention, what I claim and desire to secure by Letters Patent of the United States is:—

1. A reversible disk plow, comprising a main frame and a draft beam carried thereby, a reversible disk also carried by said main frame, a front truck supporting said draft beam in front of said disk, a lateral sliding connection between said draft beam and said truck, catches carried by said truck near each side thereof, a latch for locking said beam to one of said catches at the end of the lateral travel of said beam on said truck, and a hand lever and mechanism operated thereby for simultaneously reversing said disk and releasing said latch from engagement, substantially as described.

2. A reversible disk plow, comprising a main frame and a draft beam carried thereby, a reversible disk also carried by said main frame, a front truck supporting said draft beam in front of said disk, a lateral sliding connection between said draft beam and said truck, catches carried by said truck near each side thereof, a latch for locking said beam to one of said catches at the end of the lateral travel of said beam on said truck, a pair of scrapers reversibly mounted in front of said disk, and a hand lever and mechanism operated thereby for simultaneously reversing said disk and said scrapers and for releasing said latch from engagement, substantially as described.

3. A reversible disk plow, comprising a main frame and a draft beam carried thereby, a reversible disk also carried by said main frame, a front truck supporting said draft beam in front of said disk, a lateral sliding connection between said draft beam and said truck, catches carried by said truck near each side thereof, comprising oppositely-disposed cones each provided with an annular groove, a latch for locking said beam to one of said catches at the end of the lateral travel of said beam on said truck, comprising a spring-controlled bell-crank lever having arms adapted to ride up on the tapered surfaces of said cones and to snap into engagement with said annular grooves, and a hand lever and mechanism operated thereby for simultaneously reversing said disk and releasing said latch from engagement, substantially as described.

4. A reversible disk plow, comprising a main frame and a draft beam carried thereby, a reversible disk also carried by said main frame, a front truck supporting said draft beam in front of said disk, a lateral sliding connection between said draft beam and said truck, catches carried by said truck near each side thereof, comprising oppositely-disposed cones each provided with an annular groove, a latch for locking said beam to one of said catches at the end of the lateral travel of said beam on said truck, comprising a spring-controlled bell-crank lever having arms adapted to ride up on the tapered surfaces of said cones and to snap into engagement with said annular grooves, a pair of scrapers reversibly mounted in front of said disk, and a hand lever and mechanism operated thereby for simultaneously reversing said disk and said scrapers and for releasing said latch from engagement, substantially as described.

5. A reversible disk plow, comprising a main frame and a draft beam carried thereby, a reversible disk also carried by said main frame, a front truck supporting said draft beam in front of said disk, a lateral sliding connection between said draft beam and said truck, catches carried by said truck near each side thereof, comprising oppositely-disposed cones each provided with an annular groove, a latch for locking said beam to one of said catches at the end of the lateral travel of said beam on said truck, comprising a spring-controlled bell-crank lever having arms adapted to ride up on the tapered surfaces of said cones and to snap into engagement with said annular grooves, means for moving said cones laterally on said truck, when desired, and a hand lever and mechanism operated thereby for simultaneously reversing said disk and releasing said latch from engagement, substantially as described.

6. A reversible disk plow, comprising a main frame and a draft beam carried thereby, a reversible disk also carried by said main frame, a front truck supporting said draft beam in front of said disk, a lateral sliding connection between said draft beam and said truck, catches carried by said truck near each side thereof, comprising oppositely-disposed cones each provided with an annular groove, a latch for locking said beam to one of said catches at the end of the lateral travel of said beam on said truck, comprising a spring-controlled bell-crank lever having arms adapted to ride up on the tapered surfaces of said cones and to snap into engagement with said annular grooves, means for moving said cones laterally on said truck, when desired, a pair scrapers reversibly mounted in front of said disk, and a hand lever and mechanism operated thereby for simultaneously reversing said disk and said scrapers and for releasing said latch from engagement, substantially as described.

7. A reversible disk plow, comprising a main frame and a draft beam rigidly secured thereto, a reversible disk carried by said main frame, a front truck provided with parallel cross bars, a housing secured to said draft beam and having sleeves adapted to slide on said cross bars, a spring-impressed latch carried by said housing, a rod carried by said truck and mounted parallel to said bars, cones having their apices directed toward each other mounted on said rod, said cones each having an annular groove adapted to engage said latch, and means for tripping said latch when desired, substantially as described.

8. A reversible disk plow, comprising a main frame and a draft beam rigidly secured thereto, a reversible disk carried by said main frame, a front truck provided with parallel cross bars, a housing secured to said draft beam and having sleeves adapted to slide on said cross bars, a spring-impressed latch carried by said housing, a rod carried by said truck and mounted parallel to said bars, cones having their apices directed toward each other mounted on said rod, said cones each having an annular groove adapted to engage said latch, means for moving said cones laterally on said rod, and means for tripping said latch when desired, substantially as described.

9. A reversible disk plow, comprising a main frame and a draft beam rigidly secured thereto, a reversible disk carried by said main frame, a front truck provided with parallel cross bars, a housing secured to said draft beam and having sleeves adapted to slide on said cross bars, a spring-impressed latch in the form of a bell-crank lever provided with two engaging arms carried by said housing, a rod carried by said truck and mounted parallel to said bars, cones having their apices directed toward each other mounted on said rod, said cones each having an annular groove adapted to engage an arm of said latch, and means for tripping said latch when desired, substantially as described.

10. A reversible disk plow, comprising a main frame and a draft beam rigidly secured thereto, a reversible disk carried by said main frame, a front truck provided with parallel cross bars, a housing secured to said draft beam and having sleeves adapted to slide on said cross bars, a spring-impressed latch carried by said housing, a rod carried by said truck and mounted parallel to said bars, cones having their apices directed toward each other mounted on said rods, said cones each having an annular groove adapted to engage said latch, a hand lever, and means operated thereby for moving said cones laterally on said rod, and means for tripping said latch when desired, substantially as described.

11. In a reversible disk plow of the character described, the combination with a draft beam, a disk, an axle therefor, and a T-shaped bearing block for the axle of said disk, provided with vertically-disposed arms, of a main frame comprising a single casting having bearing faces to engage said draft beam, and curved horns to provide bearings for the vertically-disposed arms of said bearing block, substantially as described.

12. In a reversible disk plow of the character described, the combination with a draft beam, a disk, an axle therefor, and a T-shaped bearing block for the axle of said disk, provided with vertically-disposed arms, and a scraper attachment mounted over the upper one of said vertically-disposed arms, of a main frame comprising a single casting having bearing faces to engage said draft beam, and curved horns to provide bearings for the vertically-disposed arms of said bearing block, with means carried by said casting for reversing said disk and said scraper attachment, substantially as described.

13. In a reversible disk plow of the character described, the combination with a draft beam, a disk, an axle therefor, a T-shaped bearing block for the axle of said disk, provided with vertically-disposed arms, and a subsoil attachment provided with a vertically-disposed post carrying blades at its heel, of a main frame comprising a single casting having bearing faces to engage said draft beam, curved horns to provide bearings for the vertically-disposed arms of said bearing block, and also having a journal bearing for said post, substantially as described.

14. In a reversible disk plow of the character described, the combination with a draft beam, a disk, an axle therefor, a T-shaped bearing block for the axle of said disk, provided with vertically-disposed arms, a scraper attachment mounted on the upper one of said vertically-disposed arms, and a subsoil attachment provided with a vertically-disposed post carrying blades at its heel, of a main frame comprising a single casting having bearing faces to engage said draft beam, curved horns to provide bearings for the vertically-disposed arms of said bearing block, and also having a journal bearing for said post, with means carried by said casting for reversing said disk and said scraper attachment, substantially as described.

15. In a reversible disk plow of the character described, the combination with a draft beam, a disk, an axle therefor, a T-shaped bearing block for the axle of said disk provided with vertically-disposed arms, and a rear truck having a trail bar provided with a goose neck, of a main frame comprising a single casting having bearing faces to engage said draft beam, curved horns to provide bearings for the vertically-disposed arms of said bearing block, and a journal bearing for said goose neck, substantially as described.

16. In a reversible disk plow of the character described, the combination with a draft beam, a disk, an axle therefor, a T-shaped bearing block for the axle of said disk, provided with vertically-disposed arms, a rear truck having a trail bar provided with a goose neck, and a subsoil attachment provided with a vertically-disposed post carrying blades at its heel, of a main frame comprising a single casting having bearing faces to engage said draft beam, curved horns to provide bearings for the vertically-disposed arms of said bearing block, and also having a journal bearing for said post, and a journal bearing for said goose neck, substantially as described.

17. A main frame for reversible disk plows of the character described, comprising a single casting having bearing faces for the draft beam, curved horns for ends of the axle bearing block of the disk, a downwardly directed perforation to receive the post of the subsoiler attachment, and a journal bearing for the goose neck of the trail bar of the rear truck, substantially as described.

18. A main frame for reversible disk plows of the character described, comprising a single casting having bearing faces for the draft beam, curved horns for ends of the axle bearing block of the disk, a downwardly directed perforation to receive the post of the subsoiler attachment, and a journal bearing for the goose neck of the trail bar of the rear truck, with a rearwardly-projecting lug to provide a pivot support for the locking lever for said trail bar, substantially as described.

19. In a reversible disk plow of the character described, the combination with a draft beam, a disk, an axle therefor, and a bearing block for the axle of said disk, provided with vertically-disposed arms, and a scraper attachment mounted over the upper one of said vertically-disposed arms, of a main frame having bearing faces to engage said draft beam, and having bearings for the vertically-disposed arms of said bearing block, with interlocking plates carried by said casting for reversing said disk and said scraper attachment, and a hand lever and means controlled thereby for swinging said plates, substantially as described.

20. In a reversible disk plow of the character described, the combination with a draft beam, a disk, an axle therefor, a bearing block for the axle of said disk, provided with vertically-disposed arms, and a scraper attachment mounted over the upper one of said vertically-disposed arms, of a main frame having bearing faces to engage said draft beam, and having bearings for the vertically-disposed arms of said bearing block, with interlocking plates carried by said casting for reversing said disk and said scraper attachment, adjustable stops for limiting the vibration of one of said plates, and a hand lever and means controlled thereby for swinging said plates, substantially as described.

21. In a reversible disk plow of the character described, the combination with a draft beam, a disk, an axle therefor, a T-shaped bearing block for the axle of said disk, provided with vertically-disposed arms, and a scraper attachment mounted on the upper one of said vertically-disposed arms, of a main frame comprising a single casting having bearing faces to engage said draft beam, and curved horns to provide bearings for the vertically-disposed arms of said bearing block, with interlocking plates carried by said casting for reversing said disk and said scraper attachment, and a hand lever and means controlled thereby for swinging said plates, substantially as described.

22. In a reversible disk plow of the character described, the combination with a draft beam, a disk, an axle therefor, a T-shaped bearing block for the axle of said disk, provided with vertically-disposed arms, and a scraper attachment mounted on the upper one of said vertically-disposed arms, of a main frame comprising a single casting having bearing faces to engage said draft beam, and curved horns to provide bearings for the vertically-disposed arms of said bearing block, with interlocking plates carried by said casting for reversing said disk and said scraper attachment, adjustable stops for limiting the vibration of one of said plates, and a hand lever and means controlled thereby for swinging said plates, substantially as described.

23. In a reversible disk plow of the character described, the combination with a draft beam, a disk, an axle therefor, a bearing block for the axle of said disk provided with vertically-disposed arms, a rear truck having a trail bar provided with a goose neck, and a locking lever for said trail bar, of a main frame comprising a single casting having bearing faces to engage said draft beam, bearings for the vertically-disposed arms of said bearing block, a journal bearing for said goose neck, and a pivot bearing for said locking lever, substantially as described.

24. In a reversible disk plow of the character described, the combination with a draft beam, a disk, an axle therefor, a bearing block for the axle of said disk provided with vertically-disposed arms, a rear truck having a trail bar provided with a goose neck, and a spring-impressed locking lever having cam faces adapted to ride up over said trail bar and a shoulder to automatically lock same in position, of a main frame comprising a single casting having bearing faces to engage said draft beam, bearings for the vertically-disposed arms of said bearing block, a journal bearing for said goose neck, and a pivot bearing for said locking lever, substantially as described.

25. In a reversible disk plow of the character described, the combination with a draft beam, a disk, an axle therefor, a bearing block for the axle of said disk provided with vertically-disposed arms, a rear truck having a trail bar provided with a goose neck, and a spring-impressed locking lever having cam faces adapted to ride up over said trail bar and a shoulder to automatically lock same in position, with a pedal for releasing said locking lever against the action of said spring, of a main frame comprising a single casting having bearing faces to engage said draft beam, bearings for the vertically-disposed arms of said bearing block, a journal bearing for said goose neck, and a pivot bearing for said locking lever, substantially as described.

In testimony whereof, I affix my signature, in presence of two witnesses.

AUGUSTA P. McKAY.

Witnesses:
J. DEAN,
C. B. GOETCHIUS.

Copies of this patent may be obtained for five cents each, by addressing the "Commissioner of Patents, Washington, D. C."